Sept. 17, 1940.  R. E. KLAGES  2,215,243

DRAG LINK AND METHOD OF PRODUCING SAME

Filed Sept. 28, 1938

Inventor
Reynold E. Klages

By Braselton, Whitcomb & Davies
Attorney

Patented Sept. 17, 1940

2,215,243

UNITED STATES PATENT OFFICE 2,215,243

DRAG LINK AND METHOD OF PRODUCING SAME

Reynold E. Klages, Columbus, Ohio, assignor to The Columbus Auto Parts Company, Columbus, Ohio, a corporation of Ohio Application September 28, 1938, Serial No. 232,152

5 Claims. (Cl. 29—152)

This invention relates to link constructions and the method of making same, and more especially to drag link arrangements adapted for steering mechanism for automotive vehicles.

The invention embraces the provision of a drag link construction wherein there is formed integral abutments or means for positioning and retaining joint connections utilized for establishing operative connection between tie rods of an automotive vehicle.

The invention has for an object the provision of a drag link and joint construction wherein the drag link is so formed as to provide internal abutments for properly positioning ball joint constructions in such a manner that the strength of the tube from which the drag link is formed is substantially unaffected.

Another object of the invention resides in the method of producing a drag link having internal abutments or shoulders without materially reducing the effective dimension or strength of the drag link tube and without requiring special machining operations.

A further object resides in the method of forming a drag link wherein an internal shoulder is provided by formation of spaced depressions in the exterior of the tube and of facing the interior of extending projections to form a circular shoulder or abutment to position a ball joint structure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

While I have shown the arrangement of my invention embodied in physical form of drag link for the steering mechanism of automotive vehicles, it is to be understood that the invention may be used wherever the same may be found to have utility.

Figure 1:
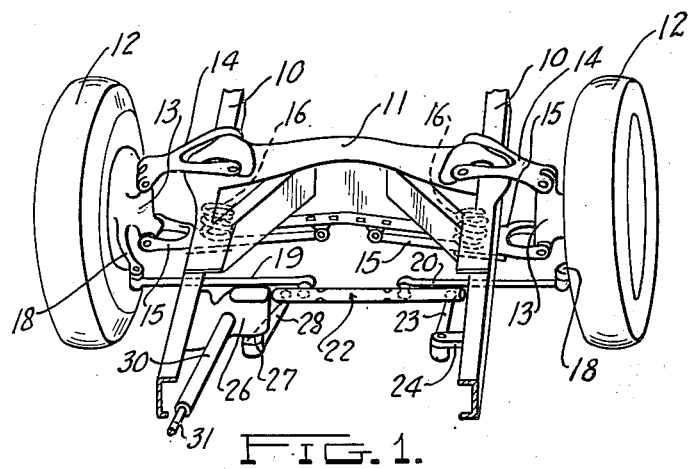
Figure 1 is a fragmentary perspective view of the forward portion of an automotive vehicle chassis illustrating a steering linkage embodying the arrangement of my invention.
Figure 2:
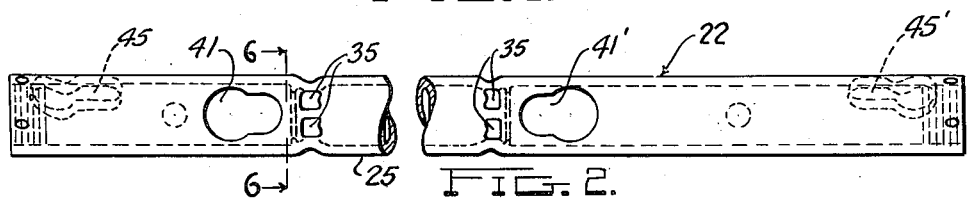
Figure 2 is an elevational view of a drag link per se of my invention.
Figure 3:
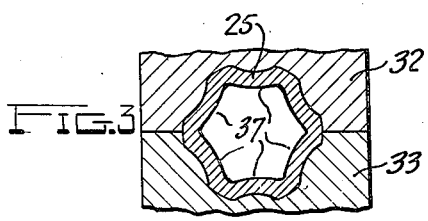
Figure 3 is a sectional view showing a method of forming the interiorly extending projections and interior abutment.
Figure 4:
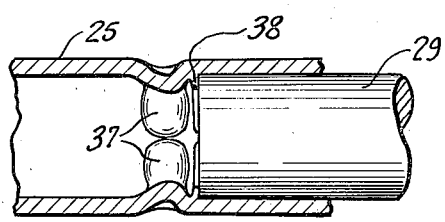
Figure 4 is a fragmentary longitudinal sectional view showing the method of finish forming the interior abutment in the drag link.

Referring to the drawing and particularly Figure 1, there is illustrated a fragmentary portion of a vehicle chassis including longitudinal frame members 10, transverse frame member 11, dirigible or steering wheels 12 which are carried upon spindles 13, the latter in turn being connected to the transverse frame member 11 by means of links 14 and a second set of links 15. Interposed between links 15 and a portion of the vehicle frame are the coil springs 16 which resiliently support the vehicle frame.

With this type of spring suspension commonly referred to as "independent springing" the spindles 13 are each provided with an arm 18, and connected to the extremity of each arm are the tie rods 19 and 20. The tie rods are joined to a drag link 22 in a manner to be hereinafter described and one end of the drag link is connected by means of an arm 23 to a projection 24 secured to and extending laterally from the frame member 10 and is pivotally connected to this projection. Suitably carried by the other frame member 10 or other suitable supporting structure is a steering gear housing 26 into which projects a shaft 27, the shaft fixedly carrying an arm 28 which is connected to the other end of the drag link. The usual steering post 30 contains a shaft 31 connected to a steering wheel (not shown), the other end of the shaft 31 being connected to gear mechanism contained within the housing 26 which in turn is connected to the arm 28. Thus, rotation of shaft 31 causes a movement of arm 28 and a longitudinal movement of drag link 22 as well as movement of tie rods 19 and 20 to effect a steering of the vehicle.

This invention has to do particularly with the drag link construction and the method of forming the same. Referring especially to Figures 2 to 5 inclusive, the drag link 22 is preferably fabricated of a comparatively thin walled tube 25 in which there is impressed indentations or depressions 35 by means of suitable dies 32 and 33, six depressions being illustrated in the form of the invention as disclosed in Figure 3. The depressions 35 are formed by inward pressure upon the tube and do not reduce the wall thickness of the tube but the metal is forced inwardly to form six projections or shoulders 37 forming abutment means in the tube. This operation may be accomplished with the tube either hot or cold. Immediately after the projections 37 are struck inwardly of the tube a ram or arbor 29 is moved longitudinally into the tube into contact with the projections 37 and forcibly form flattened abutment surfaces 38 on each of the projections which are uniplanar in character, all being arranged in the same transverse plane. These surfaces 38 thus form abutment or shoulder means to positively position the elements of the joint structures connecting the drag link with the tie rods. When the dies 32 and 33 are brought together upon the tube 25 to form the inwardly extending depressions, the tube adjacent the projections is formed to a slightly oval configuration. When the ram or arbor 29 is inserted, the arbor being cylindrical upon its movement into the tube adjacent the projections, the arbor engages the side walls of the slightly oval formation in the tube and the depressed metal of the indentations to form on the inner wall of the tube a shoulder or abutment 38. It is to be noted that the shoulder does not extend completely around the tube because the portions of the tube at its broadest dimension of the oval configuration is not engaged by the ram. Thus, it will be seen from an examination of Figure 6 that the abutment formed by the arbor does not extend entirely around the inner periphery of the tube.

The abutment 38 may, if desired, be formed by first inserting the arbor 29 into the drag link tube and afterwards depressing the metal to form the projections 37. By this means, with the arbor extremity adjacent the depressions a shoulder will be formed adjacent the inwardly extending projections.

Figure 5:
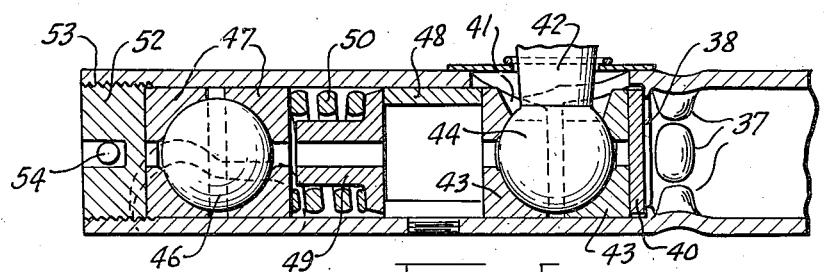
Figure 5 is a view illustrating one end of the drag link structure showing the arrangement of ball joints assembled therein.
Figure 6:
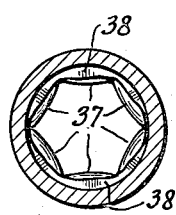
Figure 6 is a sectional view taken substantially on line 6—6 of Figure 2 showing the finished abutment formation.

A joint structure particularly adapted for use in the drag link is illustrated in detail in Figure 5 wherein a disk 40 engages the abutment or shoulder surfaces 38, the wall of the tube being provided with an opening 41 to accommodate a ball stud 42 extending into the drag link and is positioned between two bearing seats or bearing means 43 which closely engage a ball shaped portion 44 of the stud 42. The drag link is also provided with an opening 45 through which extends a similar ball stud 46 held in bearing seats 47. Positioned between ball studs 42 and 46 is a spacing collar 48, a flanged member 49 and a spring 50 interposed between the flange of member 49 and one of the bearing seats 47 to at all times urge bearing seats 43 and 47 into engagement with the ball studs 42 and 46, the end bearing seat 47 being fixedly positioned within the drag link by means of a plug or closure 52 threaded into the drag link as at 53 and held in place by means of a cutter key or pin 54. Through the use of the inwardly extending projections 37 and the formation of the uniplanar shoulder surfaces 38 a very strong and rigid abutment means is formed in the drag link without substantially decreasing the strength of the tube.

The drag link is also provided with an opening 41' similar to opening 41 to accommodate a ball stud secured to end of tie rod 20, the tube also having openings 45' and 46' to accommodate joint constructions connecting arm 23 and arm 28 to the drag link tube.

It is apparent that within the scope of the invention, modifications and different arrangements may be made other than is herein disclosed, and the present disclosure is illustrative merely, the invention comprehending all variations thereof.

What I claim is:

1. A method of producing a drag link from a comparatively thin walled tube which consists in impressing a plurality of circumferentially spaced indentations in the side wall of the tube without severing the tube wall whereby the sectional contour adjacent the indentations becomes of oval configuration, of forcing an arbor into the tube whereby the arbor contacts portions of the oval interior configuration of the tube and moves portions of the metal of the side walls of the tube into uniplanar shoulder adjacent the inwardly extending metal formed by the indentations.

2. A method of producing a drag link from a hollow member which consists in impressing at least one indentation in the side wall of the hollow member without severing the wall thereof; of inserting a ram into the hollow member; of forcing said ram into contact with the inwardly extending projection formed by the indentation to form a uniplanar shoulder on the interior wall of the hollow member.

3. A method of producing a drag link from a comparatively thin walled tube which consists in impressing at least two circumferentially spaced indentations in the side wall of the tube without severing the tube wall whereby the sectional contour adjacent the indentations becomes of oval configuration; of inserting an arbor into the tube; of moving portions of the metal of the interior side walls of the tube into uniplanar shoulder adjacent the inwardly extending metal formed by the indentations.

4. In combination, a drag link formed of a tube having a plurality of inwardly extending unsevered projections; a uniplanar shoulder formed interiorly of the tube adjacent said projections, said tube having an opening in the side wall thereof; a ball stud projecting interiorly of the tube through said opening; a pair of bearing elements surrounding the ball portion of said stud; one of said bearing elements being positioned in said tube by said projections; and spring means for urging the bearing elements into engagement with the ball stud.

5. In combination, a drag link of comparatively thin waled tubing having a plurality of inwardly extending unsevered projections; a uniplanar shoulder formed interiorly of the tube adjacent said unsevered projections; a disk abutting said shoulder, said tube having an opening in the side wall thereof; a ball stud projecting interiorly of the tube through said opening; a pair of bearing elements surrounding the ball portion of said stud; one of said bearing elements engaging said disk; and spring means for urging the bearing elements into engagement with the ball stud and said disk into engagement with the shoulder in said tube.

REYNOLD E. KLAGES.